US007234144B2

(12) United States Patent
Wilt et al.

(10) Patent No.: US 7,234,144 B2
(45) Date of Patent: Jun. 19, 2007

(54) METHODS AND SYSTEM FOR MANAGING COMPUTATIONAL RESOURCES OF A COPROCESSOR IN A COMPUTING SYSTEM

(75) Inventors: Nicholas P. Wilt, Sammamish, WA (US); Sameer A. Nene, Redmond, WA (US); Joseph S. Beda, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 864 days.

(21) Appl. No.: 10/039,036

(22) Filed: Jan. 4, 2002

(65) Prior Publication Data

US 2003/0140179 A1     Jul. 24, 2003

(51) Int. Cl.
  G06F 9/50   (2006.01)
  G06F 9/44   (2006.01)
  G06F 9/45   (2006.01)
  G06F 3/00   (2006.01)
  G06F 15/163 (2006.01)

(52) U.S. Cl. .................. 718/104; 718/102; 718/107; 718/108; 719/316; 719/321; 719/328; 711/145; 717/148; 710/52; 712/34

(58) Field of Classification Search ............ 718/100, 718/104–106, 102, 107, 108; 711/145; 719/316, 719/321, 328; 717/148; 710/52; 712/34
See application file for complete search history.

(56) References Cited

U.S. PATENT DOCUMENTS 5,404,522 A * 4/1995 Carmon et al. ............ 718/107
5,577,250 A   11/1996 Anderson et al. .......... 395/670
5,657,478 A * 8/1997 Recker et al. ............. 345/503
6,243,762 B1   6/2001 Greene et al. ............. 709/310
6,473,777 B1 * 10/2002 Hendler et al. ............ 707/206
6,487,642 B1   11/2002 Duruoz et al. ............. 711/145
2001/0049753 A1 * 12/2001 Gary ......................... 709/330

OTHER PUBLICATIONS

Bankston, J. et al., "Pipeline Processing with Modula-2," *J. Pascal Ada Modula 2*, 1986, 5(5), 46-51.
Nakatsuka, Y. et al., "A One Chip Super Graphics CPU with Direct Unified Memory Controller Suitable for Car Information and Control System," *Proceedings of the IEEE 2001 Custom Integrated Circuits Conference*, 2001, 421-423.
Randall, M., "Graphics IC Simplifies Design, Boosts Performance," *Computer Design*, 1986, 25(11), 73-77.
Williams, T., "Graphics Processor Boasts Virtual Memory," *Computer Design*, 1986, 25(7), 43-44.

* cited by examiner

*Primary Examiner*—Lewis A. Bullock, Jr.
(74) *Attorney, Agent, or Firm*—Woodcock Washburn LLP

(57) ABSTRACT

Systems and methods are provided for managing the computational resources of coprocessor(s), such as graphics processor(s), in a computing system. The systems and methods illustrate management of computational resources of coprocessors to facilitate efficient execution of multiple applications in a multitasking environment. By enabling multiple threads of execution to compose command buffers in parallel, submitting those command buffers for scheduling and dispatch by the operating system, and fielding interrupts that notify of completion of command buffers, the system enables multiple applications to efficiently share the computational resources available in the system.

63 Claims, 8 Drawing Sheets

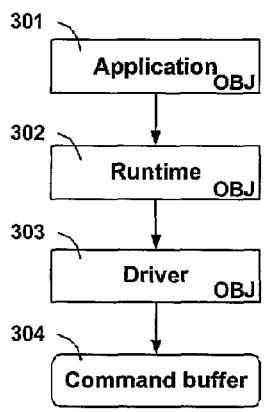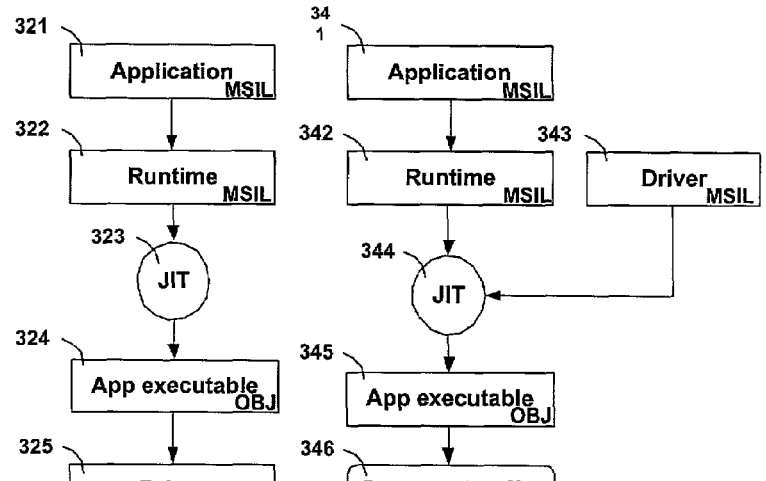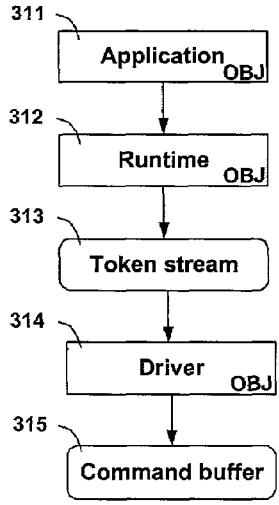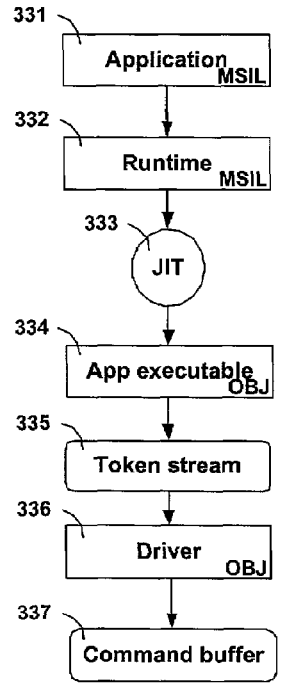
FIGS. 3A-E

METHODS AND SYSTEM FOR MANAGING COMPUTATIONAL RESOURCES OF A COPROCESSOR IN A COMPUTING SYSTEM

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document Copyright© 2001, Microsoft Corp.

FIELD OF THE INVENTION

The present invention relates to systems and methods for managing computational resources of coprocessors in a computing system.

BACKGROUND OF THE INVENTION

Beginning with the first time-sharing system in the mid-1960s, operating systems (OSs) have implemented numerous methods of allowing multiple applications to share computational resources of a computer without knowledge of one another. By allocating small 'time slices' to each application, and interrupting when a 'time slice' has expired, a computer can present each application with the illusion that it is running alone on the computer. For example, two applications could be running on a system with 1 millisecond time slices. In such a case, each application would run somewhat less than half as fast (due to the overhead needed to swap between the two) than if they were running on the computer alone, each getting about 500 time slices per second. Longer time slices involve less overhead, but also result in a coarser granularity of execution, making the system less suitable for timing-sensitive applications.

An enormous amount of work has gone into developing various abstractions such as virtual memory, processes, and threads that interact to provide applications with software models that enable the computational resources of the central processing unit (CPU) to be shared. However, these abstractions have not yet been augmented so that they can apply to the management of computational resources in graphics processing units (GPUs) as well as host microprocessors.

In this regard, in the last few years, graphics processors have become significantly more functional. The number of transistors in PC graphics chips has grown far faster than Moore's Law would suggest, i.e., the number of transistors in graphics chips has grown from about 200,000 in 1995 to about 60,000,000 transistors in 2001. The computational power of these chips has also increased with the number of transistors; that is, not only can graphics chips process more data, but they can also apply more sophisticated computations to the data as well. As a result, today, the graphics chip(s) in a computer system can be considered a computational resource that complements the computational resources of the host microprocessor(s).

The software model presented by a graphics chip is somewhat different than the software model presented by the host microprocessor. Both models involve context, a set of data that describes exactly what the processor is doing. The contexts may contain data registers, which contain intermediate results of whatever operation is currently being performed, or control registers, which change the processor's behavior when it performs certain operations. On a 32-bit INTEL® processor, for example, the EAX data register is used as an accumulator, to perform multiplications, to hold function return values, and so on. The floating point control word (FPCW) is a control register that controls how floating point instructions round inexact results (single, double, or extended precision, toward positive or negative infinity, toward zero, or toward the nearest; and so on). As a general rule, however, graphics processors have a great deal more state in control registers than general-purpose microprocessors. Graphics processors' high performance stems from their pipelined, flexible, yet fixed function architecture. A great deal of control register state is needed to set up the operations performed by the graphics processor. For example, a set of control registers may include (a) the base address(es) and dimensions of one or more texture maps currently serving as input, (b) the texture addressing and filtering modes, the blending operation to perform between texture values and interpolated color values, (c) the tests to apply to the alpha and Z values of the fragment to decide whether to incorporate it into the color buffer and (d) the alpha blend operation to use when incorporating the color fragment into the color buffer at the final rendering stage. While graphics processors contain numerous scratch registers such as iterators that control their processing, generally it is not necessary to save those registers during context switches because context switches are not permitted on a granularity that requires them to be saved. In any case, even if such registers must be saved during a context switch, generally they are not directly available to software applications. The opacity of volatile register state to client software is merely one distinction between the software model presented by graphics processors, as compared to the software model presented by general purpose microprocessors.

To date, attempts to manage the computational resources of coprocessors, such as graphics processors, have been ad hoc at best. Historically, there has not been much demand for careful management of these computational resources because only one application has been active at a time. In the context of the commercial workstation applications that 3D acceleration hardware initially was designed to accelerate, such as 3D modeling and animation, end users typically would operate one application at a time. Even if more than one application were active at a given time, the end user would perform a significant amount of work on each application before switching to another and the granularity of switching between applications was on the order of seconds or much longer. Game applications, the second set of applications to substantially benefit from graphics hardware acceleration, also are typically run one at a time. In fact, the DIRECTX® application programming interfaces (APIs) in WINDOWS® specifically enable game applications to gain exclusive access to the hardware resources in the computer system and particularly the graphics chip.

As graphics chips become more functional, it is reasonable to expect the number of active applications that demand significant computational resources from them to increase, and for the granularity of switching between these applications to become finer. In some areas, this trend is already evident. For example, video decoding acceleration such as hardware-accelerated motion compensation ("mocomp") and integer discrete cosine transform ("IDCT") has been added to most graphics chips in the 2001 timeframe. Since it is possible to launch a video playback application and run other applications at the same time, playing back video and running any other application that demands computational resources from the graphics processor will require careful management of those resources, to ensure that the video playback and other application(s) both deliver a high quality end user experience.

Other potential sources of increased demand for graphics processors' computational resources include the composition of multiple applications' output, and improved utilization of hardware acceleration by 2D graphics APIs such as GDI (graphical developer interface) or GDI+. In short, the need for efficient and effective management of computational resources of graphics processor(s) in a computing system will only be increasing, along with the increasing power, flexibility and speed of the graphic processors themselves and along with increasing number of applications making simultaneous use of the computational resources of the graphics processors.

SUMMARY OF THE INVENTION

In view of the foregoing, the present invention provides systems and methods for managing the computational resources of coprocessor(s), such as graphics processor(s), in a computing system. The systems and methods illustrate management of computational resources of coprocessors to facilitate efficient execution of multiple applications in a multitasking environment. By enabling multiple threads of execution to compose command buffers in parallel, submitting those command buffers for scheduling and dispatch by the operating system, and fielding interrupts that notify of completion of command buffers, the system enables multiple applications to efficiently share the computational resources available in the system.

In various embodiments, the present invention provides methods for controlling the computational resources of coprocessor(s) in a host computing system having a host processor, wherein the methods include controlling one or more coprocessors of the computing system with command buffers submitted to the coprocessor(s) by the host processor, transmitting data back to the host computing system in response to commands in the command buffer(s) and scheduling the transmission of the command buffer(s) by a managing object included in the host computing system, wherein the computational resources of the coprocessor(s) are simultaneously available to multiple applications instantiated on the host computing system.

In related and other embodiments, the invention provides a computing device and computer readable media having stored thereon a plurality of computer-executable modules for controlling the computational resources of coprocessor(s) in a host computing system having a host processor, the computing device and computer executable modules each including a managing object for controlling the coprocessor(s) of the computing system with command buffers submitted to the coprocessor(s) by the host processor and for scheduling the transmission of the command buffers. The computing device and computer executable modules also each include means for transmitting data back to the host computing system in response to commands in the command buffer(s), whereby the computational resources of the coprocessor(s) are simultaneously available to multiple applications instantiated on the host computing system.

Other features and embodiments of the present invention are described below.

BRIEF DESCRIPTION OF THE DRAWINGS

The system and methods for managing the computational resources of graphics processor(s) are further described with reference to the accompanying drawings in which:

FIGS. 3A through 3E illustrate exemplary implementations of a driver component that translates runtime-level commands to hardware-specific commands;

DETAILED DESCRIPTION OF THE INVENTION

Overview

Figure 1A:
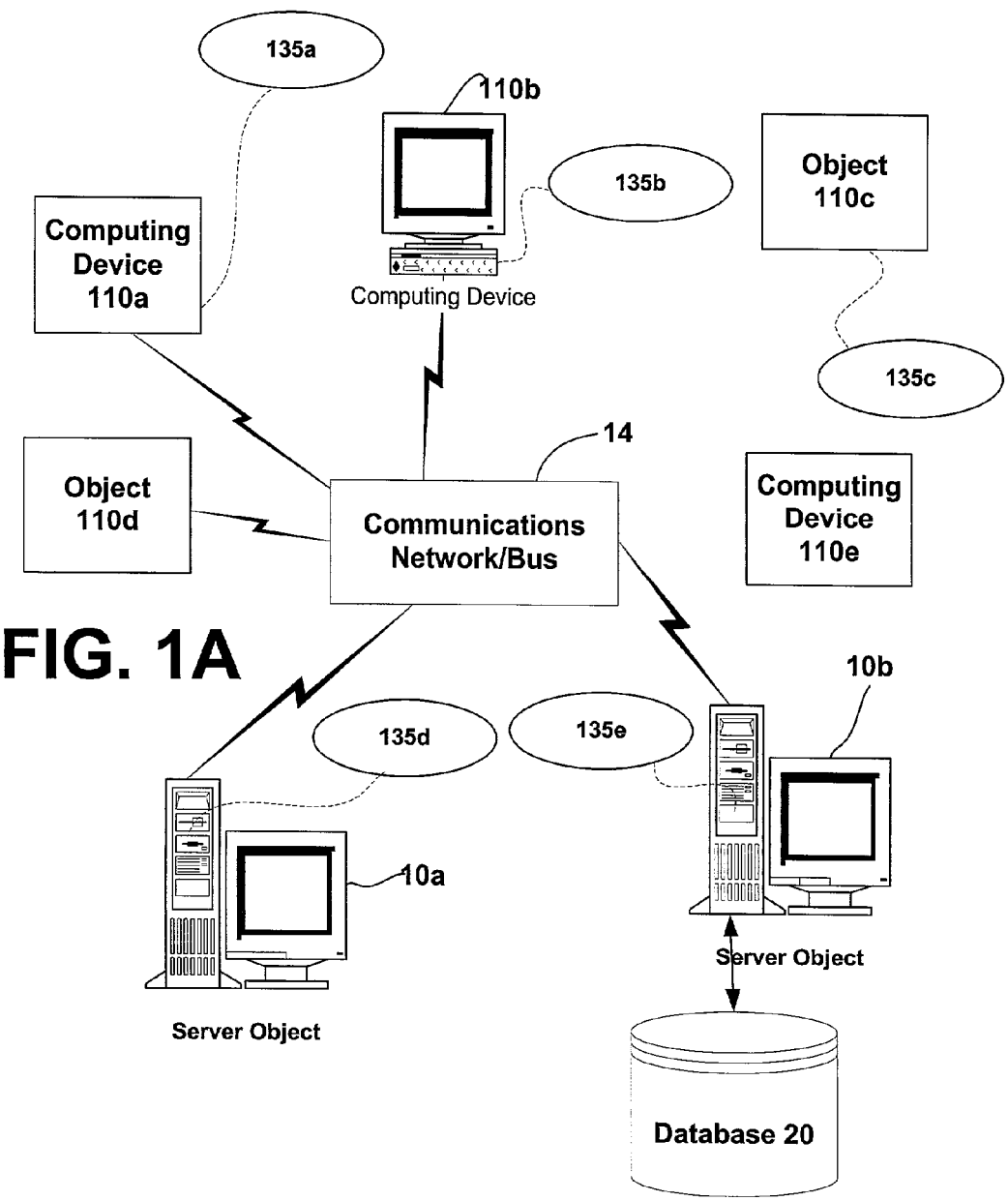
FIG. 1A is a block diagram representing an exemplary network environment having a variety of computing devices in which the present invention may be implemented.

As described in the background, there are many present and potential sources of increased demand for graphics processors' computational resources. When more than one of these sources demands access to a graphics processor at approximately the same time, the graphics processor may not be free to serve both sources in a way that meets the demand satisfactorily. Thus, the present invention provides various ways to manage the scheduling and dispatch of graphics processing requests by multiple applications in order to ensure the computational resources of coprocessor units, such as graphics processing units, are efficiently distributed to the requesting applications. Accordingly, the present invention provides methods and systems for controlling the computation resources of coprocessor(s) in a host computing system, wherein the coprocessor(s) are controlled with command buffers submitted by the host processor and wherein the scheduling of the transmission of the command buffers to the coprocessor(s) is performed by an object, such as the operating system, of the host computing system, making the computational resources of the coprocessor(s) simultaneously available to multiple applications.

Glossary of Terms

The following is a brief list of terms and corresponding definitions for referencing various terms utilized in the detailed description of the invention below.

An accelerated graphics port (AGP) is a high speed bus designed to facilitate the rapid transmission of data from a host microprocessor to a graphics peripheral.

A command buffer is a stream of hardware-specific drawing commands ready for consumption by graphics hardware, e.g., see the definition for token stream below.

A context is the hardware state utilized to execute commands by a processor. Herein, a thread context refers to the hardware state of a host microprocessor and a hardware context refers to the state of graphics hardware. A context is loaded before a stream of instructions (on the host) or commands (on a graphics chip) can be executed.

A central processing unit (CPU) includes a host microprocessor.

A device driver interface (DDI) is a standardized interface used by the operating system to interact with a hardware driver.

A display list is a series of commands for the graphics hardware that has been recorded so the commands can be readily 'played back,' purportedly more efficiently than if the original series of commands were executed again. Display lists often are opaque to the application, i.e., they cannot be edited, since they have been translated into a hardware-specific form.

A dynamic link library (DLL) is a unit of executable code that can be linked into and shared by multiple processes simultaneously. This document assumes that the code in DLLs executes in user mode.

Direct memory access (DMA) is a hardware feature that enables a peripheral to read or write directly from host-accessible memory.

A deferred procedure call (DPC) is a routine called by an operating system, such as WINDOWS®, that typically executes in response to an interrupt, but runs at a slightly lower priority than an interrupt service routine (see ISR below). As a rule, interrupt service routines should do the minimum processing needed to resolve the interrupt and queue a DPC to do other work needed to respond to the interrupt.

A graphics processor is a hardware peripheral designed to accelerate drawing commands for graphics, such as bit block transfers (BLTs) and 3D graphics primitive drawing processes such as triangle rasterization. In this regard, a graphics processor may be contrasted with the more general and clumsy resources of the host microprocessor.

A host microprocessor is a processor that executes the operating system and/or applications being run in the operating system. The host microprocessor(s) in a system contrast with graphics processors or other computational resources in the system.

An interrupt is a hardware feature that enables a peripheral to divert a host microprocessor from its current process and transfer control to a special location in memory. The operating system uses this mechanism to call driver code known as an interrupt service routine (ISR) to respond to the interrupt.

An interrupt service routine (ISR) is a function, typically in a device driver, that is called by the operating system when the hardware controlled by the driver signals an interrupt, e.g., see also DPC.

Just-in-time (JIT) compiling is a compilation process that introduces an extra step in the translation from source code to object code. In this regard, the source code is translated into readily compilable, hardware-independent intermediate language that is transmitted to a client computer, where it is compiled "just in time" into object code that can run on the client.

Kernel mode is a privileged processor mode that allows system code to have direct access to hardware resources.

A process is a logical division of labor in an operating system. In WINDOWS®, a process comprises a virtual address space, an executable program, one or more threads of execution, some portion of the user's resource quotas, and the system resources that the operating system has allocated to the process's threads.

A resource is a synchronization primitive that can grant non-exclusive access to multiple threads, or exclusive access to a single thread.

A synchronization primitive is an object that can be used to synchronize multiple threads' access to shared resources, such as critical sections, mutexes, semaphores or events.

A thread is an executable entity that comprises a program counter, a user-mode stack, a kernel-mode stack and a set of register values.

A token stream is a stream of hardware-independent tokens that describe a series of drawing operations. A token stream can be translated by a hardware-specific software component, such as a driver, into a command buffer or other series of hardware commands.

A user mode is a mode of the host microprocessor that does not allow code to directly access hardware resources.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may make request to coprocessor resources. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may make requests for coprocessing resources managed by the techniques of the present invention.

FIG. 1A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 1A. In accordance with an aspect of the invention, each object 10 or 110 may contain an application that might request coprocessing resources of a host system.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. The management of coprocessing resources in accordance with the present invention may thus be distributed among clients and servers, acting to manage specialized coproccessing in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since highly specialized coprocessing resources may in practice be physically located in one or more locations, the management of applications requesting the use thereof is of great utility in such a system.

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and is accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to the processing of data by a graphics chip.

The Internet commonly refers to the collection of networks and gateways that utilize the TCP/IP suite of protocols, which are well-known in the art of computer networking. TCP/IP is an acronym for "Transport Control Protocol/ Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 1A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 1A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to manage the computational resources of coprocessor(s).

In a network environment in which the communications network/bus 14 is the Internet, for example, the servers 10 can be Web servers with which the clients 110a, 110b, 110c, 110d, 110e, etc. communicate via any of a number of known protocols such as hypertext transfer protocol (HTTP). Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing graphics data i. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Exemplary Computing Device

Figure 1B:
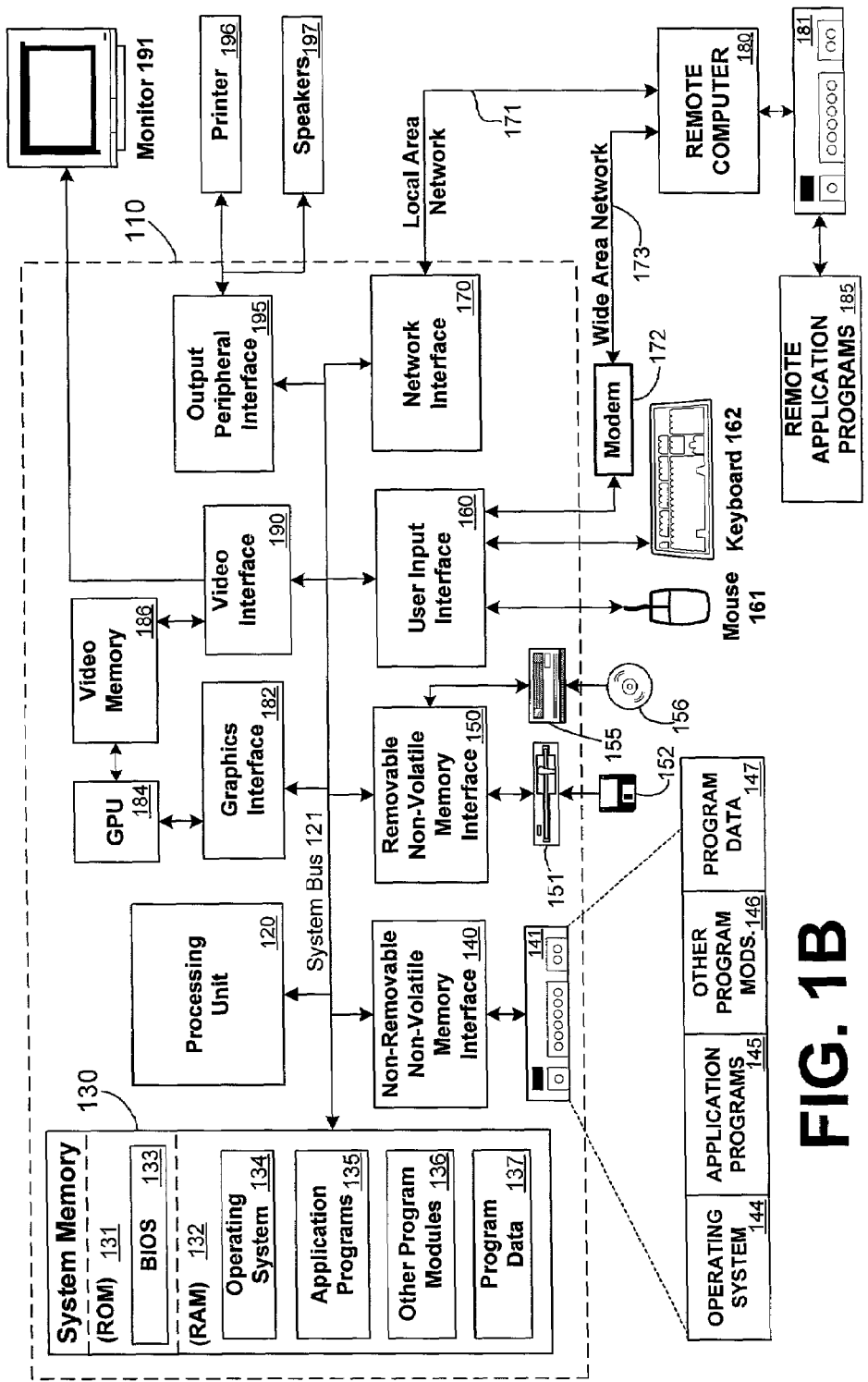
FIG. 1B is a block diagram representing an exemplary nonlimiting computing device in which the present invention may be implemented.

FIG. 1B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved is a desirable, or suitable, environment for operation of the management of coprocessor resources of the invention.

Although not required, the invention can be implemented via an operating system, for use by a developer of services for a device or object, and/or included within application software that aids in managing computational resources. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1B illustrates operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1B provide storage of computer readable instructions, data structures, program modules and other data for the computer 110. In FIG. 1B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for AGP communications. One or more graphics processing units (GPUs) 184 may communicate with graphics interface 182. In this regard, GPUs 184 generally include on-chip memory storage, such as register storage and GPUs 184 communicate with a video memory 186. The invention may be described more generally in connection with any coprocessor, of which GPUs 184 are but one example. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1B. The logical connections depicted in FIG. 1B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .Net platform includes servers, building-block services, such as Web-based data storage and downloadable device software. Generally speaking, the .Net platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While exemplary embodiments herein are described in connection with software residing on a computing device, one or more portions of the invention may also be implemented via an operating system or a "middle man" object between a coprocessor and requesting object, such that image processing services may be performed by, supported in or accessed via all of .NET's languages and services, and in other distributed computing frameworks as well.

Management of Computational Resources in a Computing System

I. Graphics Processor Programming

Initially, a brief description of different mechanisms, and the tradeoffs thereof, for controlling graphics processors is presented. Although various embodiments of the invention are described in the context of graphics processors, the invention may be applied to coprocessors that supplement the operation of host processors(s). Once the different mechanisms are presented, the methods for controlling graphics processor(s) in accordance with the present invention are described. The methods of the invention are implemented in a way that facilitates management of their computational resources by the operating system.

| Method | Mechanism | # Clients | User/Kernel |
|---|---|---|---|
| Port I/O (PIO) | IN/OUT instructions | 1 | K |
| Memory-Mapped I/O (MMIO) | Reads and writes to special memory locations | 1 | K/U |
| Direct Memory Access (DMA) | Direct reads from system memory | N | U |
| Accelerated Graphics Port (AGP) | Direct reads from special system memory | N | U |

The first method, Port I/O or PIO, involves executing IN instructions to request information from the peripheral, and OUT instructions to send information to the peripheral. PIO is extremely inefficient and generally does not scale well with multiple instances of a given piece of hardware in a system. As a rule, IN and OUT instructions can be executed only in kernel mode, the microprocessor mode that allows direct manipulation of hardware. If a user mode thread encounters such an instruction, the system generates an exception, which, in the case of a user mode thread attempting to control hardware, usually results in the thread terminating execution.

Memory-mapped I/O enables the hardware to be controlled through reads and writes to special memory locations. One advantage of MMIO is that if the memory locations that control a given piece of hardware can be changed, multiple instances of the hardware may reside in a single system. So-called relocatable MMIO was a key feature for multiple monitor support on the PC, for example. Like PIO, MMIO typically is performed in kernel mode, using kernel mode addresses. Some systems, however, expose the MMIO addresses to user mode so the hardware may be programmed directly without making the transition to kernel mode. Mutual exclusion must still be enforced, and spurious writes by untrusted or buggy user mode software can cause unpredictable behavior by the hardware. Thus, most MMIO implementations require the memory locations to be accessed through kernel mode, but some enable user mode access to the hardware. Such a design runs the risk of unpredictable, catastrophic failure if the hardware is not robust in the face of spurious writes to its registers.

Only one thread may perform PIO or MMIO at a time, since those operations directly affect the state of the hardware. Thus, when a system supports both PIO and MMIO, the system enforces mutual exclusion between code paths that use PIO and/or MMIO to send instructions to the hardware, i.e., to ensure that only one thread programs the hardware at any time. Typically, this means a thread must wait on a lock, such as a critical section or mutex (mutual exclusion object), before executing code to program the hardware through PIO or MMIO. Acquiring and releasing locks takes time, even if there is no contention for them. If there is contention, i.e., if multiple threads simultaneously attempting to acquire a given lock, overall performance can decrease if many threads must wait a long time to acquire a lock.

Direct Memory Access (DMA) is a common method for moving data within computer systems, and has found application in the control of graphics processors as well as disk drives, network adapters, and external buses such as USB and IEEE 1394. DMA generally refers to the ability of a peripheral, such as a digital camera or disk controller, to read from or write to memory without directly involving the host processor. The host sets up the DMA transfer in advance, page locking the memory region where a digital camera, for example, is to write the image data from a picture it is about to take, and specifying that memory location to the camera. Page locking causes the virtual memory manager to forego writing the memory locations in question out to disk. Once this is done, the camera can take the picture and write the image data into memory, then notify the host that the DMA transfer has been completed. In the context of graphics processor control, a series of commands for the graphics processor can be written into memory, and then transferred to the graphics processor via a DMA operation.

DMA has many advantages over the other methods of submitting graphics processor commands. First, it facilitates parallel execution by the host and graphics processors. Since these 'other operations' to be performed by the CPU often involve generating more commands for the graphics processor, it is common to maintain multiple DMA buffers and 'ping-pong' between them, writing to one while the graphics processor reads and executes another. Second, DMA enables multiple applications to write command buffers into memory, and then submit the contents of the command buffers to the graphics processor when they are ready for execution. The graphics processor can only execute one command buffer at a time, but DMA facilitates the simultaneous construction of many command buffers because different threads can write into distinct memory regions that contain command buffers. Third, DMA frequently results in more efficient usage of the bus resources in the system. In other words, the bandwidth achievable through DMA is often higher than the bandwidth achievable by direct participation of the host microprocessor.

The Accelerated Graphics Port (AGP) is a specialized bus designed specifically to serve as a high bandwidth conduit to transfer data from system memory to a graphics processor. For the purposes of the present description, AGP may be considered a special case of DMA.

Besides the mechanism for delivering information to and receiving information from the hardware, another important distinction to make in our background discussion centers on notification of the host microprocessor that the graphics processor has completed some task, or that some event has occurred that is visible to the graphics processor. Non-limiting examples of tasks include finishing execution of a command buffer or the completion of a specific command.

Non-limiting examples of events include vertical retrace of the display device, the completion of a field of digitized video from a video port, or the retracing of a specific scanline in the display device.

One method, known as polling, involves probing the hardware repeatedly to ascertain whether an event has occurred or task has been completed. Polling may entail reading a hardware register with an IN instruction or MMIO read, or sending a command requesting that the answer be written to a specific memory location that subsequently can be read by the host. The common feature of all polling methods is that repeated checks must be performed until the task has been completed or the event has occurred. As a rule, polling is wasteful of the computational resources in the host microprocessor(s).

An alternative method for notifying the host microprocessor of a completed task or an external event is known as an interrupt. An interrupt is a hardware mechanism that diverts the host microprocessor from whatever it is doing and transfers control to a special location in memory. The operating system uses this mechanism to call driver code known as an interrupt service routine to respond to the interrupt.

Interrupts have several advantages over polling based mechanisms. For one thing, the cost of setting up and responding to an interrupt is fixed, while the cost of a polling based mechanism increases approximately linearly with the number of polls performed. As a result, interrupt based schemes generally consume less bus bandwidth as well as fewer CPU cycles than polling based schemes. Interrupts can also result in a more timely notification if the interrupt latency is smaller than the time between when the event occurs and when the next poll is performed.

Given the above background, the present invention develops a set of assumptions that enable the computational resources in a graphics processor to be managed reasonably. The present invention also identifies certain hardware features that enable a system to make such management more effective and/or reliable.

A first assumption made in accordance with the present invention is to use predominantly DMA-based input. This first assumption is that the majority of commands to the graphics processor should be submitted via a DMA mechanism. As described above, DMA-based command buffer submission facilitates the eventual consumption by the graphics processor of multiple DMA buffers generated by multiple applications running on the host microprocessor(s). Lower-frequency commands, such as initiating the execution of a DMA command stream, can be sent to the hardware via a method such as MMIO. But high frequency commands for the graphics chip, such as loading image data, commands to draw features such as lines and triangles, and commands to change hardware state, for the most part should be sent via DMA.

A second assumption made is that interrupt-based notification is preferable. Thus, in accordance with the present invention, interrupts are used for the majority of notifications by the graphics processor of events such as the completion, or partial completion, of a command buffer, completion of a DMA operation to write data into memory visible to the host processor, vertical retrace of the display device or completion of a specific command. The host is thus expected to set up interrupt notification of events that the host needs to know about, and expected to respond to those interrupts in a timely fashion.

Given these assumptions, we can broaden our focus from graphics processors and contemplate a system with two processors: a host CPU, and a coprocessor that is controlled by sending command buffers from the CPU, that can send data back to the CPU, and that coordinates control by notifying the CPU of various events when they occur. The examples in this document frequently assume that the coprocessor is a graphics processor (as when describing possible synchronization problems and how a system can be designed to solve those problems efficiently), but these examples are for illustrative purposes only and do not limit the scope of this invention to graphics processors.

In line with the above assumptions regarding computational resources in a graphics processing system, a non-limiting system is described below that makes efficient, shared use of the computational resources in a coprocessor.

Figure 2:
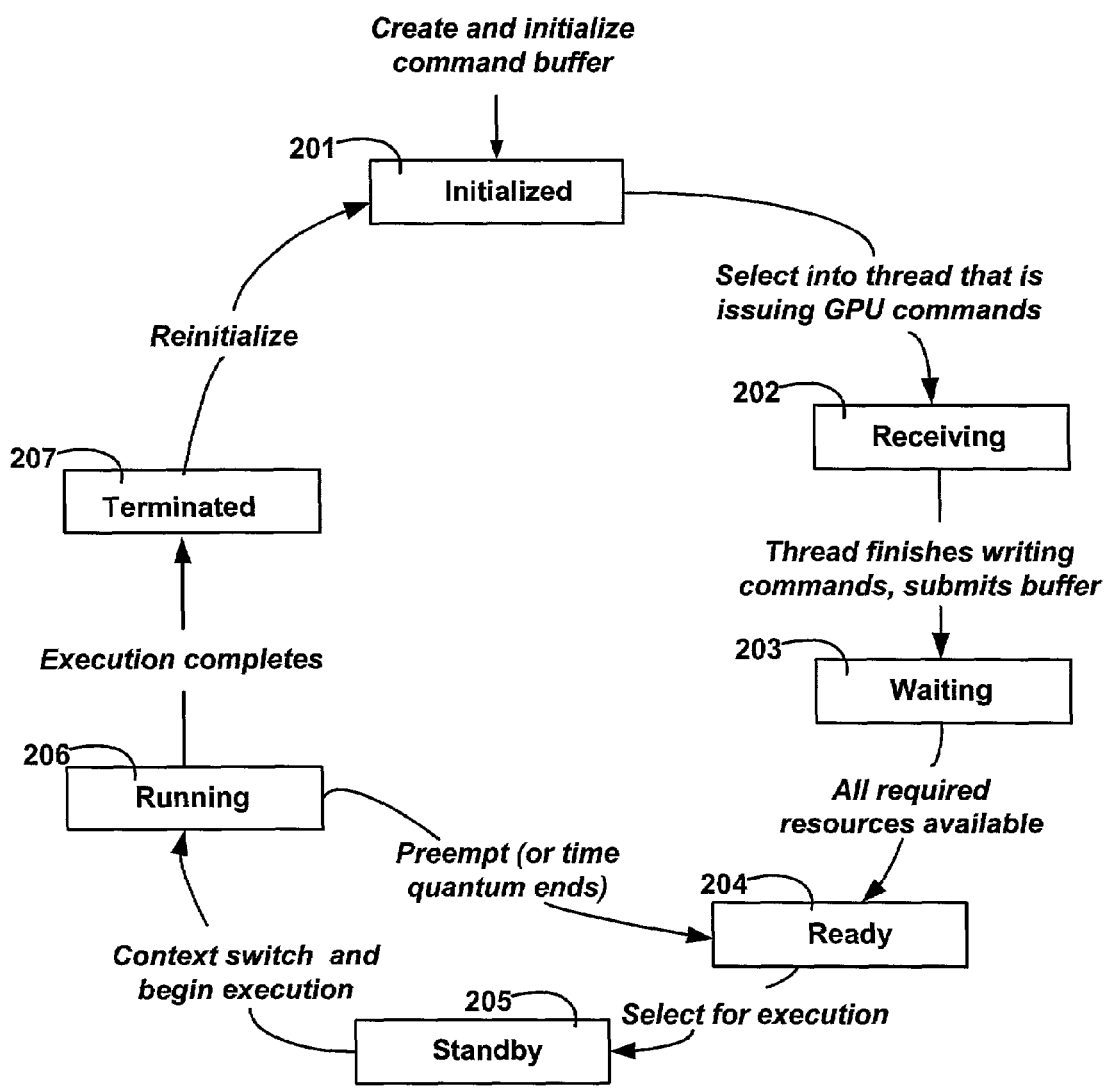
FIG. 2 illustrates an exemplary life cycle of a command buffer as it is used by applications to send commands to a coprocessor.

FIG. 2 depicts the life cycle of a command buffer as it is used by applications to send commands to the coprocessor, such as a graphics processor. When a command buffer is created and initialized, the buffer enters the initialized state 201. The command buffer is then available to be selected and written into by a thread that wishes to issue commands to the graphics processor. When a thread selects the command buffer, the memory in the command buffer is made available to that thread (perhaps by mapping the memory in the command buffer into that thread's address space) and the command buffer enters the Receiving state 202. As one of ordinary skill in the art can appreciate, the details of this mapping may vary. For example, the command buffer memory could be made visible to user mode, kernel mode, or both. In addition, there are numerous options as to the nature of the executable code that is writing into the Receiving command buffer. In this regard, FIGS. 3A through 3E depict several of these options, i.e., several different architectures for writing into the command buffer.

For purposes of describing FIGS. 3A through 3E, an application is a process, or a thread in a process, that implements some specific graphical application participating in the system. The runtime is middleware provided in the operating system that the application uses. Among other things, the runtime may validate the application's usage of an application programming interface (API), translate simple-to-use, high-level API calls into more complicated, lower-level constructs that are more readily translatable to hardware commands, and so on.

The driver is a hardware-specific component that translates runtime-level commands to hardware-specific commands. The driver components depicted in FIGS. 3A through 3E are the portions of the driver that translate runtime-level commands to hardware-specific commands. Some portions of the driver that perform tasks other than this translation, such as interrupt handling and command buffer dispatch, would probably reside in kernel mode and are not contemplated in FIGS. 3A through 3E. Most of the object code depicted in FIGS. 3A through 3E may run in user mode, although some portions, as pointed out below, can run in kernel mode. The command buffer is the piece of memory that includes commands that can be consumed directly by the hardware via some DMA mechanism. Several of the figures also show a token stream, which is a hardware-independent stream of runtime-level primitives that can be translated into hardware-specific commands by the driver.

Lastly, some of the figures show a JIT (Just-In-Time) compilation component that can translate a hardware-independent intermediate language into object code for execution by the host microprocessor. The boxes with OBJ in the corner include object code that can be directly executed by the microprocessor. Boxes with MSIL in the corner include intermediate code that is compiled by the JIT in order to execute on the microprocessor. If the application and runtime are both available on the client in intermediate form, the JIT can translate them into a unified piece of object code, shown as app executables 324, 334 and 345 FIGS. 3C to 3E, respectively, that implements the application.

FIG. 3A shows the application 301, runtime 302 and driver 303 each performing their respective roles, calling into lower-level object code until the driver 303 writes hardware-specific commands into the command buffer 304. The application 301 could be an executable process, or a thread in a process, while the runtime 302 and driver 303 could each reside in DLLs. As depicted in FIG. 3A, all of the object code may reside in user mode (although some or all of the runtime 302 and/or driver 303 may reside in kernel mode). If the runtime 302 determines that the command buffer 304 must be submitted before execution can continue, or the driver 303 determines that the command buffer 304 is out of space, a transition to kernel mode may be requested to submit the command buffer 304 and retrieve another one in order to continue.

FIG. 3B shows a variant in which the runtime 312 emits a hardware-independent stream of commands into a buffer 313, which is then parsed by the driver 314 and written into a command buffer 315. Application 311 operates to call lower-level object code in connection with runtime 312. FIG. 3B approximates the current architecture of the DIRECTX® software component, in which the runtime translates application activity into DrawPrimitives2 ("DP2") tokens. When the DP2 token stream is submitted, a kernel transition occurs and the driver 314 translates the DP2 token stream into hardware-specific commands in kernel mode. FIG. 3B does not make any assumptions about whether the driver 314 is in user mode or kernel mode, and in this regard, driver component 314 could reside in user mode as well as kernel mode.

FIG. 3C shows a variant in which the application 321 and runtime 322 are synthesized into a unified piece of object code by a JIT compiler 323. The resulting piece of object code 324 then interacts with the driver 325 to write hardware-specific commands into the command buffer 326.

FIG. 3D shows the JIT variant of the situation described for FIG. 3B, in which a hardware-independent token stream 335 is emitted by the software 334 above the driver 336. The driver 336 then translates the token stream to hardware-specific commands for the command buffer 337. As with FIG. 3C, application 331 and runtime 332 are synthesized into a unified piece of object code 334 by JIT compiler 333.

FIG. 3E shows a system in which the application 341, runtime 342, and part of the driver 343 are all available on the client in intermediate language form MSIL. The JIT compiler 344 synthesizes these components into a unified piece of object code 345 specifically optimized to run on that particular client computer, taking into account not only the host microprocessor but also the coprocessor hardware configuration.

Referring back to the command buffer life cycle depicted in FIG. 2, regardless of the method by which commands are written into the command buffer, the thread writing into the receiving command buffer eventually submits to the command buffer either because the command buffer has been filled, or because the drawing commands that have been written into the buffer are executed forthwith. At that time, the command buffer enters the waiting state 203, and the contents of the command buffer may not be submitted to the hardware until all of the resources utilized to execute the command buffer are available. As an example of a circumstance that may force a wait, if an application draws into a surface, the drawing must be completed before that surface may be selected as a texture.

Once the waiting criteria have been fulfilled, the command buffer enters the ready state 204, where the scheduler considers it for submission to the coprocessor. The scheduler has a great deal of flexibility in deciding which command buffer should be submitted to the hardware. The scheduler may take into account the priority, if any, of the command buffer, the priority of the requesting thread, the real-time requirements of the system, and so on. Once the command buffer has been selected as the next to run, the command buffer enters the standby state 205. On some systems, only one command buffer per coprocessor may be in the standby state 205 in the system.

When the command buffer in the standby state 205 can be submitted to the hardware, the system switches the coprocessor context to the context required by the command buffer, and then submits the command buffer to the hardware. This operation entails some involvement from the driver, for example to initiate a DMA operation using the base address and size of the command buffer. The command buffer remains in the running state 206 until some event preempts execution of the command buffer or the entire contents of the command buffer have been read and executed.

If the entire command buffer has been executed, the command buffer enters the terminated state 207, where it becomes available for the system to reinitialize and make available to another thread in the initialized state 201.

If the command buffer is preempted, it is assumed that the hardware has the capability to save the hardware context in such a way that execution of the command buffer can be resumed where the preemption occurred. The command buffer can then be recycled into the ready state 204 and be re-submitted to the hardware to resume from where it stopped. The description below regarding preemptible command buffer execution describes this in more detail.

With respect to context switching, the system described above can accommodate hardware-accelerated, or at least driver-facilitated, context switching, in which hardware contexts are maintained by the driver and context switching may be supported natively in the hardware. Contexts may be cached in local video memory or other high speed memory, for example. In this case, the operating system requests that the driver load a given context into the hardware. The context switch and command buffer dispatch may be specified in a single DDI (Device Driver Interface) call for performance reasons.

Alternatively, the operating system may maintain a canonical notion of the hardware context and construct a command buffer that sets the hardware to the state corresponding to a given context. In this case, loading the context during the transition from the standby state 205 to the running state 206 entails dispatching such a constructed command buffer to the hardware. Alternatively, the head of a command buffer could be reserved for an optional context switch. If the context switch is deemed unnecessary by the operating system, for example, because the hardware already contains the appropriate context, the system may specify the command just beyond the context switch block as the base address of the command buffer. Whether a separate command buffer, head of a command buffer, or other mechanism is employed by the operating system to load context into the hardware before beginning execution, driver complexity is reduced since the driver would only know that it was dispatching command buffers to the hardware, without knowing whether they were loading hardware context or causing drawing commands to be executed. Driver complexity is reduced, however, at a potential performance cost since native hardware support for context switching using fast memory may have performance advantages over command buffer based context switching. Such a system would be more amenable to innovations such as the addition of lightweight context switching on existing drivers, however.

With respect to lightweight contexts, the hardware context includes a great deal of state that may not be needed for certain classes of applications. For example, if the coprocessor is a graphics processor, the full multitexturing, vertex shading, and pixel shading state of a modern graphics chip may not be needed for simple 2D graphics applications. To accommodate such applications, the system could define one or more lightweight context types that would be more efficient to load into the hardware before beginning execution of a command buffer. In addition, the system could potentially remember which portions of the heavyweight context state was unaffected by the loading of a lightweight context, and optimize subsequent context switches to avoid re-loading state that was already present in the hardware. Such optimizations could be performed either by a system that required formal support of context switching at the driver level, or that loaded hardware context manually using a command buffer or other mechanism.

With respect to interrupt handling, interrupts may be used for efficient management of coprocessors' computational resources because they facilitate the host microprocessor's performance of useful work while the coprocessor hardware is running. The presently described embodiments detail some of the applications for interrupts in the system and the features that interrupts would enable in each case. In all cases, interrupts present an opportunity for the operating system to notify clients of the event that caused the interrupt, whether by writing memory or signaling a thread synchronization object such as an event.

For interrupts on command buffer completion, when a command buffer is finished executing, the system is notified so it can select another command buffer to submit to the hardware. Whether the coprocessor is idle from when it signals the interrupt until another command buffer is submitted, or if the coprocessor begins executing a previously-queued command buffer (as described below), the system must be notified so it can select another command buffer for submission (or eventual submission) to the hardware. Since the interrupt signals that the command buffer has been executed, the system can release all of the resources that were needed for the command buffer and unblocks pending command buffers that need those resources, and can also recycle the command buffer for use by another application.

For signal-interrupt commands in the command buffer, if a command could be written that instructed the hardware to signal an interrupt when the preceding commands have finished executing, the system could provide client applications with fine-grained, application-controlled completion notifications, ranging from writing a piece of memory to setting an event or other thread synchronization object when the interrupt-command is encountered.

For interrupts on the occurrence of VSYNC, for graphics processors, an interrupt when VSYNC (vertical retrace of the display device) occurred would enable a variety of capabilities in the system.

If the system were composing display frames and page flipping, the VSYNC interrupt would signal the need to compose the back buffer of a display frame (i.e., prepare for the next VSYNC).

The system could use the VSYNC notifications to estimate the presentation times of future frames, and make this information available to clients. For video, that would enable the composition of an interpolated and/or deinterlaced output frame that corresponded to the time of presentation. For temporal animation controlled by a continuous time domain, that would enable rendering the animation at precisely the time corresponding to presentation.

The system could use VSYNC notifications to enable clients to throttle their frame rates to the display refresh, i.e. render at 85 Hz if the display is refreshing at 85 Hz. For naïve client applications, the presentation call could be made synchronous (have the thread block until an event is signaled; signal the event on VSYNC). More sophisticated clients could specifically wait on the event, and do useful work in the interim between finishing their drawing and waiting for the display refresh.

For interrupts when the display refresh reaches a given scanline, an interrupt that signaled when the display refresh reached a given scanline would enable a system that implemented timed delivery to carefully control the anticipated time of presentation. Let $T=0$ be the presentation time of the primary currently being displayed, $T=1$ be the presentation time of the back buffer that will be flipped to and seen by the end user on the next VSYNC, $T=2$ be the presentation time of the back buffer that will be composed on the next VSYNC, and $T=3$ be the presentation time of the next display frame after that. When a client requests the presentation time to draw for, a naive implementation of timed delivery might specify $T=3$, to be sure the application had sufficient time to finish its drawing before the results were required for composition into the back buffer. If the display started refreshing recently, however, there might be time for the client to draw targeting $T=2$ and still complete in time to participate in the back buffer composition after VSYNC occurs. An interrupt that signaled when the display refreshed a given scanline would enable the timed delivery subsystem to give clients different presentation times, depending on whether the display was about to finish refreshing. For example, the system could hand clients $T=2$ as the anticipated presentation time until the display was half-done refreshing; then it could start handing clients $T=3$ as the anticipated presentation time. The scanline number that caused this behavior change could even be adjusted according to system load.

Tear-free updates to the primary can be implemented by setting this interrupt to signal immediately after the region to be updated has been refreshed by the display device. When the interrupt is signaled, the graphics processor can be asked to perform the drawing operations needed to update the display, and no tear will be observed unless the system takes so long to execute those commands that the display refresh has reached the update region again when the update occurs.

With respect to synchronization, in order to enforce proper synchronization, the system would track dependencies between the objects being operated on by the client application(s), and ensure that those dependencies were respected during command buffer dispatch. The Waiting state 203 in FIG. 2 represents an opportunity to wait until operations that the command buffer depended upon had been completed. For example, if an application renders to a surface and then selects that surface as a texture, the rendering must be completed before further drawing can proceed. Similarly, if an application draws into a surface and then requests a Blt using that surface as a source surface, the drawing must be completed before the Blt can start. Another example of a synchronization requirement would be a page flip: if an application creates an overlay surface, draws into the back buffer of the overlay and requests a page flip, the drawing must be completed before the page flip or a rendering artifact will be observed as the drawing is done into the front buffer of the overlay.

All of these synchronization requirements can be accommodated in a system that schedules command buffer dispatch as described above. As an application writes commands into a command buffer, the system can track which resources are required by that command buffer in order to execute. Some resources can be acquired non-exclusively (for example, palettes or surfaces to read from or surfaces to texture map from), while others must be acquired exclusively (for example, surfaces to write to or perform 3D rendering into). The system could potentially leverage thread synchronization primitives to enforce this synchronization of command buffers; for example, a thread synchronization primitive exists in WINDOWS® NT that can be acquired non-exclusively by any number of threads or exclusively by a single thread. If a command buffer had an affiliated list of resources that needed to be acquired, along with whether exclusive access were needed, then the thread dispatching a command buffer could transition the command buffer from the Waiting state to the Ready state by waiting on the synchronization objects associated with the command buffer. The command buffer could be submitted to the hardware once the thread had acquired all of the needed synchronization objects.

The system must detect cases where a resource is requested that depends on commands earlier in the command buffer having been executed before the resource can become available. When that occurs, the thread must submit the command buffer, and begin composing another command buffer. The second command buffer can simply specify the resource, and the above-described synchronization mechanisms would accommodate the dependency.

With respect to queueing of command buffers, due to the high performance of graphics hardware, it is critical to minimize the latency between command buffer completion and the submission of another command buffer. Otherwise, the graphics hardware wastes valuable time waiting for another command buffer to be submitted. One possible solution to this problem is to queue up a context switch and command buffer dispatch before the current command buffer has finished executing. Then, provided the hardware and driver support this capability, the hardware can immediately begin execution of another command buffer when the current command buffer has completed. The system then has more time to prepare another command buffer for execution: the graphics hardware will only go idle if it completes the new command buffer before another one has been queued up.

With respect to preemptible command buffer execution, the system described here provides for hardware support for preemption. A variety of events could potentially cause preemption of a command buffer during execution, ranging from an external event such as VSYNC to hardware enforcement of a time quantum. To implement this feature, the hardware and driver would have to enable the hardware context to be saved, such that execution of the preempted command buffer can be resumed where it left off; and the operating system would have to be notified so it could put the command buffer back in the Ready state mentioned in FIG. 2. One reason to implement such preemption is to guarantee that a display frame is composed immediately after VSYNC (to make sure it will be ready when the next VSYNC occurs). Hardware enforcement of a time quantum would cause a command buffer to be preempted after executing for some set amount of time, such as 2 milliseconds. If the command buffer contains very expensive commands, such as drawing large, texture-mapped, alpha blended triangles, the hardware may have to preempt its execution to enable other command buffers to be considered for submission.

With respect to command buffer heterogeneity, although the preceding discussion generally has treated command buffers as homogeneous, there is no reason the system could not provide for application-specific command buffers with corresponding hardware context. For example, the system may wish to treat 2D/3D drawing and video decoding differently at the command buffer level, loading different hardware context before the dispatch of a command buffer of a given type.

The idea of treating command buffers as heterogeneous has good synergy with the idea of lightweight contexts, since only a subset of the available commands may be available when operating on a lightweight context.

With respect to guard page for detection of command buffer overflow, the user mode code that writes into the command buffer can track the number of bytes left in the command buffer and detect when the number of bytes needed to write a given command would exceed the number of bytes available. Due to the large number of variables that contribute to the commands that need to be written to this buffer, however, manually tracking this byte count would be an onerous and error-prone programming task. One method to reduce the complexity of this task would be to allocate a guard page just beyond the end of the command buffer and mark that page non-writeable. Memory writes that overrun the buffer would then cause an exception. User mode code writing into the command buffer could surround the write instructions with a structured exception handling block, field the exception and return an error to the runtime if the command buffer overflows. The interface to the user mode driver would then be simpler and more efficient than alternative implementations in which byte counts were passed between the runtime and the user mode driver.

With respect to dealing with incorrect command buffer contents, in a system that permits user mode code to write into command buffers, rogue writes can corrupt the contents of command buffers before they are submitted to hardware. Without careful defensive engineering, such corruption could cause the system to hang or behave erratically. Depending on the underlying hardware design, there are several ways to deal with this eventuality.

If the hardware has the ability to validate command buffers as it reads and executes them, it could signal an interrupt or premature termination of the command buffer when an invalid command was encountered. The system could notify a client process of such an event with an error return, exception, or some other mechanism.

Alternatively, if the hardware cannot validate command buffers as it executes them, the system could be given the option of resetting the hardware if it has not responded within a certain timeframe.

With respect to device selection into a single thread, one way to reduce the amount of thread synchronization in the system is to enable devices to be selected into threads, and for threads to have the concept of a "current device," such that there is a one-to-one correspondence between devices and threads. The advantage of this approach is that mutual exclusion would be assured within the scope of the device without having to acquire critical sections, mutexes, or other synchronization primitives to ensure mutual exclusion. Operations that stray outside the scope of the device, such as performing some operation on a surface that is globally accessible, would still have to synchronize. Even such operations could leverage the mutual exclusion property of a device bound to a thread, by enabling global objects such as surfaces to be bound to devices.

A system that implemented the concept of a "current device" for threads could still enable applications to access an arbitrary device. The software infrastructure that enabled such access would simply have to be separate and synchronize with other threads, at some additional performance cost.

With respect to token streams and the retention of hardware-independent drawing commands, for some applications, having the ability to cache a series of commands for graphics hardware in a hardware-independent piece of memory called a "token stream" can result in higher performance by enabling the application to amortize the effort required to compose the buffer. For example, a series of drawing commands that included a rotation could be written into such a buffer; then the application could redraw the scene with a different angle of rotation just by changing a few values in the buffer and re-submitting the token stream. DIRECT3D® execute buffers are a good example of an implementation of this idea.

In the context of this invention, token streams serve as an important intermediate step between the application and the hardware. At some point, the drawing commands must be translated into hardware-specific commands in order to be executed by the hardware; but performing that translation in real time as the application makes drawing calls (so-called "immediate mode") is not always the most efficient way to perform the drawing. And hardware-specific buffers (referred to as "command buffers" in this document) are essentially opaque to the application, since the details of the translation to hardware-specific commands make it difficult or impossible for applications to edit those buffers. Hence, token streams serve as an important intermediate data structure that may or may not be implemented by the system, depending on whether the system needs to implement a hardware-independent, potentially editable description of a series of commands for the GPU.

With respect to display lists and retained hardware-dependent drawing commands, there is precedent in the graphics hardware industry for the caching of a series of drawing commands in a way that is opaque to an application, purportedly so the series of drawing commands can be executed again more efficiently. These cached drawing commands are often referred to as "display lists." The idea is that static elements of a scene (such as rigid objects) could be 'rendered' into display lists, and then when drawing the scene, the application would invoke the appropriate display list rather than performing the drawing calls for every display update. In practice, the execution characteristics of display lists vary so widely from one implementation to the next that applications must make onerous assumptions about the underlying implementation in order to decide whether to use them.

The system described in this document can expose display list functionality readily by using the user mode driver interface that translates DDI level commands to hardware-specific commands. The details of how the display list would be constructed could vary: the application could set a mode that caused drawing commands to be recorded into a display list instead of executed (in OpenGL, this mode is set by calling glNewList), or the application could construct a token stream and then request that it be translated into a display list. In any case, the system would ask the user mode driver component to translate the commands' DDI counterparts into hardware-specific commands and write them into a temporary buffer or buffers (since the exact size of the hardware-specific command stream is not known until after the translation has been performed). When the recording is stopped, or once the token stream has been parsed, the system could then allocate a command buffer or command buffers of suitable size and copy the translated hardware commands into them so they can be executed readily by the hardware.

Due to the assumptions that have been made about the underlying hardware implementation, implementing display lists in the context of this invention has the advantage of more consistent execution characteristics from one hardware implementation to the next. In other words, if display lists confer a performance advantage on one hardware implementation, they are likely to be faster across all hardware implementations. As far as application developers are concerned, this consistency is an enormous advantage, since using display lists is a burden on application developers and they must be able to make informed decisions as to when the additional investment needed to take advantage of display lists will pay off.

With respect to graphics hardware executing multiple command buffers, the system can be modified to support graphics hardware that can execute multiple command buffers simultaneously. For example, the graphics hardware may include multiple discrete graphics processors that can operate in parallel. While some such hardware uses parallel processing to increase fill rates via 'scan-line interleaving,' it may also be possible for distinct command buffers to be executed simultaneously by such processors. Making provision for such hardware architectures would be an exercise in allowing multiple command buffers to be put in Standby and having the kernel mode scheduler ensure that the multiple command buffers to be executed did not access any of the same resources except in a read-only fashion (such texture mapping).

With respect to virtualized resources, the system described herein is capable of virtualizing resources such as video memory surfaces, vertex and index buffers, palettes, and other limited hardware resources. The term 'virtualize' refers to the idea that applications can behave as though they have more resource than is available across the system. For example, 'virtual memory' enables applications to allocate more memory than is physically present in the system, and the operating system swaps memory to and from local mass storage devices in order to maintain the illusion that the memory is physically present. The CPU has facilities that enable the operating system to monitor memory usage so physical memory that is not currently needed can be 'paged out' to the disk to make room for memory that is needed.

In the context of this invention, GPU resources such as video memory similarly can be virtualized by tracking the resources needed for execution of a given command buffer, and ensuring that those resources are available when the command buffer is issued to the hardware. Video memory could be managed in a way analogous to virtual memory above, with the system treating system memory as the 'mass storage device' for 'paging out' video memory surfaces. When a command buffer is selected for execution that requires a surface that had been pulled back into system memory, the operating system would have to allocate a new video memory surface (possibly making room by freeing video memory surfaces or pulling other surfaces from video memory to system memory) and copy the system memory contents to that surface. The resulting surface would likely wind up in a location different from its original location, so the operating system would have to keep track of references to video memory surfaces and 'fix up' those references in the command buffer before dispatching the command buffer to the hardware.

Figure 4:
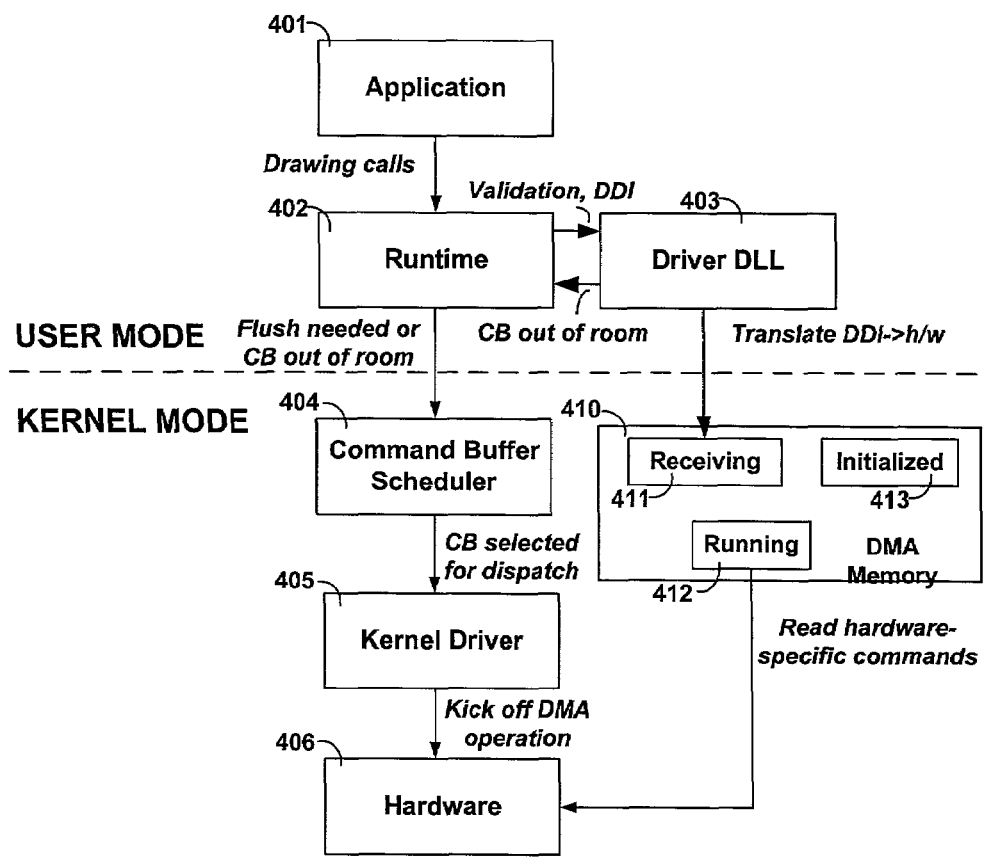
FIG. 4 illustrates an exemplary user mode driver DLL implementation of the invention.

FIG. 4 depicts an exemplary user mode driver DLL implementation of the above-described invention. In FIG. 4, the application 401, runtime 402 and part of the driver 404 operate in user mode to write drawing commands into hardware-specific command buffers in DMA memory. In a contemporary PC system, these writes are typically be non-temporal writes into AGP memory; and as depicted in this implementation, the application 401 resides in an EXE and the Runtime 402 and user mode driver 403 reside in DLLs that are dynamically linked into the application 401. These details of the user mode portion of the system can vary, as described below; specifically, the application 401, application 401 and runtime 402, or application 401, runtime 402 and user mode driver 403 could potentially be managed code.

To defend against unauthorized replacement of the user mode driver 403, the system queries the kernel driver 405 (since kernel code is trusted from a security standpoint) for the user mode driver DLL 403 to load.

The command buffer scheduler 404 ("scheduler") and kernel driver 405 work together in kernel mode to dispatch command buffers to the hardware 406 (the scheduler 404 decides which command buffer should be dispatched, while the kernel driver 405 instructs the hardware 406 to dispatch a command buffer at the request of the scheduler). This system contemplates that the bulk of the driver logic would reside in the user mode driver DLL 403, not the kernel driver 405. While the User Mode Driver can contain large amounts of code that maps DDI-level calls into hardware-specific commands (which operation can be complicated and error-prone, especially when compiling a vertex and/or shader program), the Kernel Driver is comparatively small and simple, maximizing system robustness.

Figure 5:
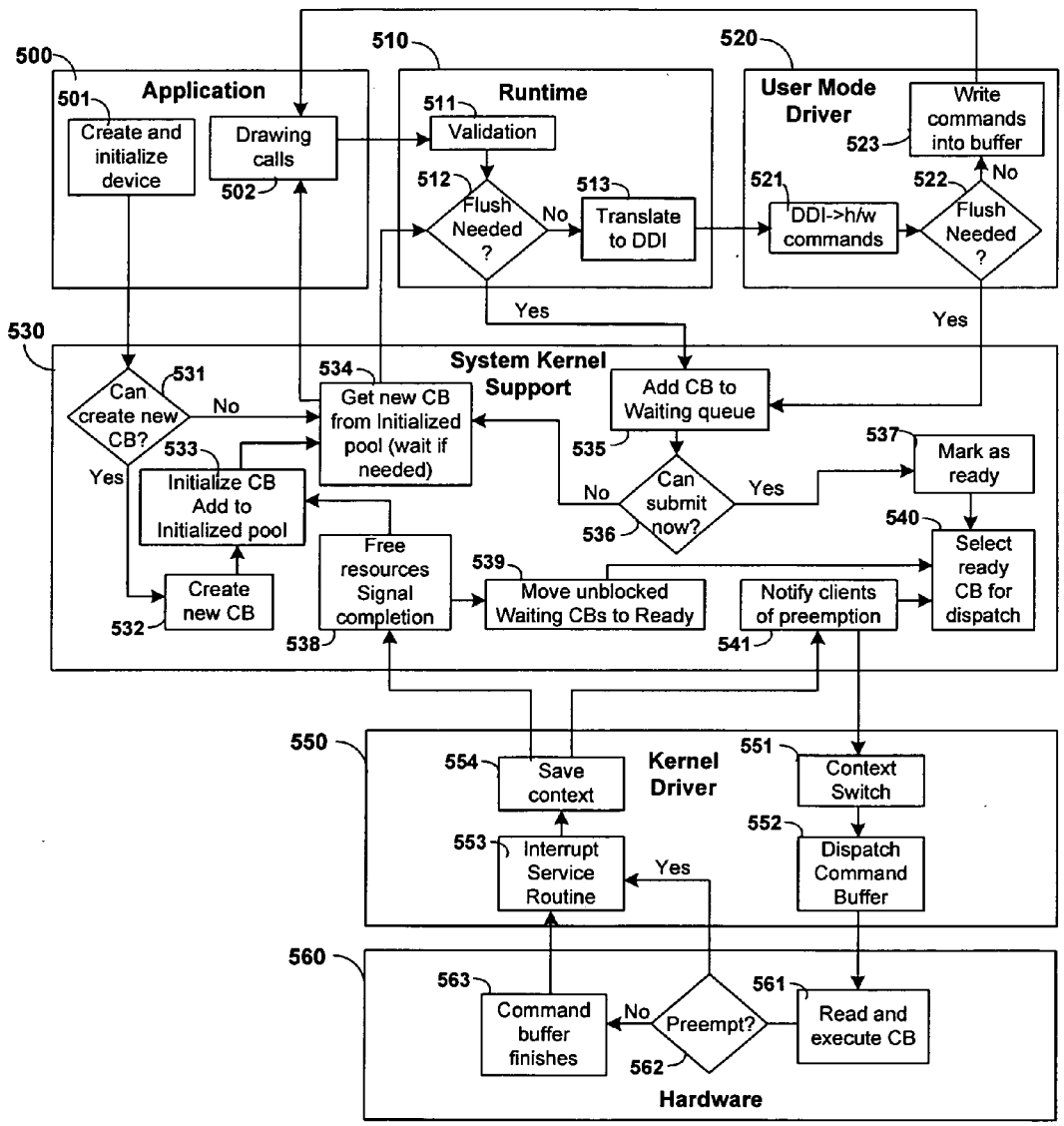
FIG. 5 illustrates an exemplary sequence of events that occur when an application makes application programming interface calls to perform graphics operations in exemplary detail.

FIG. 5 clarifies the sequence of events that occur when an application is making API calls to perform graphics operations. The block diagram components of FIG. 5 are shading coded: user mode components are of medium shade, kernel mode components are shaded lightly, and the hardware is shaded darkly. The command buffers are not specifically depicted in FIG. 5 as a hardware component; as per FIG. 4, the user mode driver 520 writes hardware-specific commands into the device's current command buffer, the command buffer scheduler (part of the system kernel support 530) dispatches the command buffer to the hardware 560 via the kernel mode driver 550, and finished command buffers are recycled for use by an application in the system. It is noted that multiple applications 500 can potentially share the pool of available command buffers, with the system kernel support 530 arbitrating sharing of that resource.

When the application 500 initially creates a drawing context 501, the system kernel support 530 checks to see whether a new command buffer can be created 531. If so, the new command buffer is created 532 and initialized 533, and the thread obtains an initialized command buffer 534 before the Application 500 can perform drawing calls 502. If a command buffer could not be created in step 531, the application 500 must wait until an initialized command buffer becomes available 534. Once the application 500 has obtained a command buffer, the application 500, runtime 510 and user mode driver 520 enter the typical interaction between the three components that cause hardware-specific commands to be written into the command buffer. The drawing calls 502 from the application 500 are validated 511 by the runtime 510; a check 512 then determines whether a flush of the current command buffer is needed. If not, the drawing command is translated to a simpler, canonical DDI call 513 and passed to the user mode driver 520. The driver translates the DDI call into hardware specific commands and attempts to write them into the command buffer. If the check 522 for flush determines that there is no room in the command buffer, the command buffer must be submitted to the system kernel support 530 and a new command buffer obtained from same before the command can be written and execution can continue. If either the runtime 510 or the user mode driver 520 determines that a flush is needed, per step 535 the command buffer is added to the waiting queue. At that time, the system kernel can check 536 whether the command buffer can be submitted forthwith (typically because no command buffer is running). If not, the command buffer is left in the waiting queue and a new command buffer must be obtained 534. It is noted that this functional block, which waits until a suitable initialized command buffer is available and then allocates it to the device, is identical to the operation needed by the application 500 before it can begin drawing.

The arrows are also shading coded. The darkest arrows trace the "typical" thread execution of the application 500 as it initializes and performs drawing commands and the runtime 510 and user mode driver 520 translate those drawing commands into hardware-specific commands and write them into the command buffer. If the runtime 510 or user mode driver 520 determine that a flush is needed (i.e., the command buffer must be submitted), the thread of execution designated by green arrows is followed: the command buffer is added to the waiting queue and submitted if possible, then a new command buffer is obtained so execution can continue.

The medium shaded arrows trace the "typical" path taken by a command buffer after it is added to the waiting queue in step 535. If the command buffer can be dispatched immediately (the check 536), the command buffer is marked as ready 537 and selected for dispatch 540. Otherwise, the waiting command buffer must be marked Ready in the normal course of events, when the current running command buffer finishes execution.

When a ready command buffer is selected for dispatch 540, the system kernel support 530 has the kernel driver 550 context switch the hardware to the appropriate context 551 and dispatch the command buffer to the hardware 552. The hardware then reads and executes the command buffer 561, until it is preempted or the command buffer finishes. If the command buffer completes normally 563, the hardware signals an interrupt and the interrupt service routine 553 executes. The ISR may wish to save the hardware context 554 at this time, although the driver may wish to defer this operation to the context switch 551, in case the hardware should be asked to execute two command buffers in a row that operate on the same context. After this step 554, the kernel system support 530 can free the resources needed by that command buffer 538, as well as signal any notification mechanisms such as events to let interested clients know that the command buffer is completed. After step 538, the kernel system support has two distinct tasks: it must reinitialize the newly available command buffer and add it to the initialized pool 533, and it must unblock any waiting command buffers and move them into the ready queue 539. After step 539, another command buffer can be selected for dispatch 540.

The case of preemption is handled slightly differently than normal command buffer completion, as delineated by the orange arrows. Since the preempted command buffer did not finish, the system must not notify clients of its completion (step 538) or unblock dependent command buffers (step 539). Instead, the driver saves the context 554 of the partially executed command buffer such that it can be restarted where the preemption occurred, notifies any clients 541 that need to know about the preemption, and selects the next Ready command buffer to dispatch 540.

Examples of occurrences that might cause preemption include external events such as VSYNC or the arrival of the display refresh to a particular location such as a scanline, or expiration of a time quantum. In addition, for management of time quanta, the operating system may use a mechanism to preempt the graphics processor by calling the Kernel Driver 550. This would equate to expiration of a time quantum as arbitrated by the hardware, except that the complexity and responsibility for deciding when to preempt the graphics processor then rests with the System Kernel Support 530 rather than the Hardware 560. It is presumed that the system has previously set up a response to such an event, such as executing a series of Blt commands when the refresh passes a certain scanline (for a tear-free update).

Note that many of the ideas presented above can be applied to the system described in connection with FIGS. 4 and 5. For example, per the above, the system kernel support 540 could potentially take over the context switching task 551 by having the kernel driver 550 dispatch a context switch command buffer. For another example, lightweight contexts could be supported in this system by differentiating between context types and, potentially, types of command buffers, as described in further detail above. For another example, step 540 ("Select ready command buffer for dispatch") could be modified slightly to take advantage of the ideas presented above, in which the hardware begins executing a previously-selected command buffer as soon as the running command buffer finishes. For yet another example, an efficient way for the runtime 510 and user mode Driver 520 to detect command buffer overflow 522 would be for the system kernel support 530 to allocate an unwriteable guard page at the end of each command buffer, and use structured exception handling to detect when a write to the guard page has been attempted. Finally, the ideas of making the system robust in the face of invalid command buffers could be readily incorporated into this system, either by signaling an exception when an invalid command caused the hardware to generate an interrupt, or by resetting the hardware via a special kernel driver 550 entry point if it became unresponsive for too long.

Figure 6:
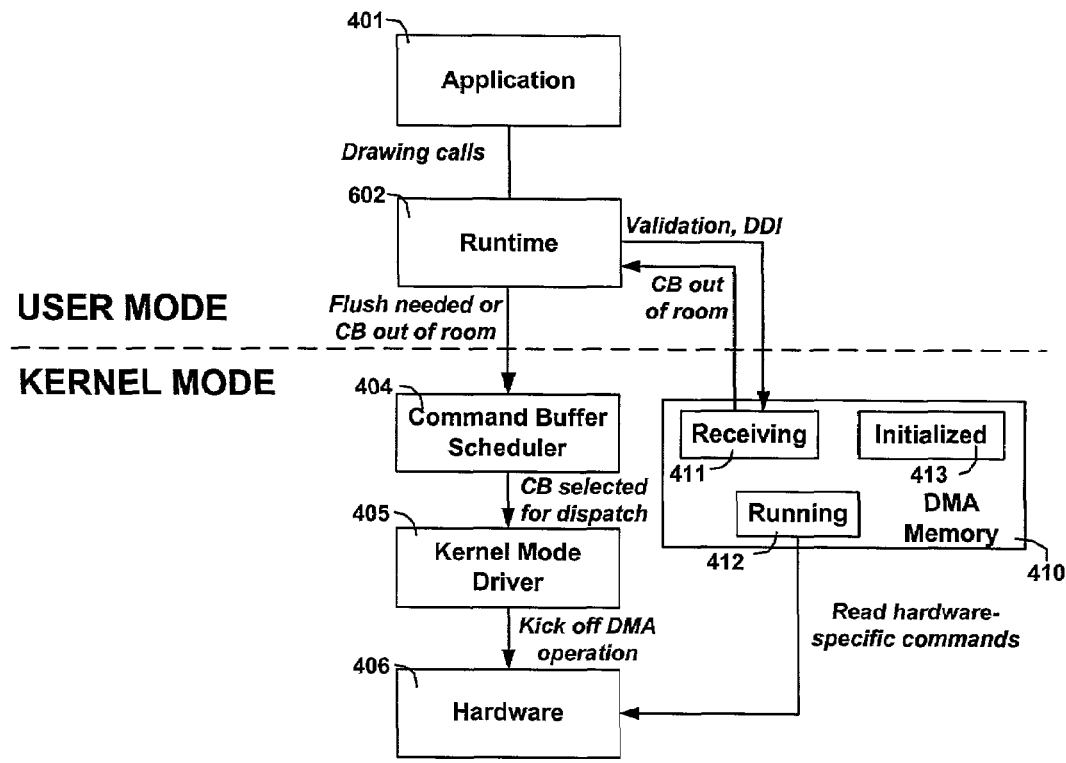
FIG. 6 illustrates an exemplary hardware consumable canonical command buffer format in accordance with an embodiment of the invention.

FIG. 6 illustrates an exemplary hardware consumable canonical command buffer format and is a specific implementation of the invention as described above. This implementation is similar to the one described in connection with FIG. 4, except that the commands are written by the runtime 602 (part of the operating system) into a buffer using a canonical command buffer format. There is precedent in the industry for such formats, e.g. the "DrawPrimitives2" token stream used in DIRECT3D®. If this format is suitable for direct consumption by the hardware, execution proceeds as described in connection with FIG. 4, except that the hardware can directly consume output from the runtime 602 instead of requiring a translation layer in the user mode driver DLL 403.

Figure 7:
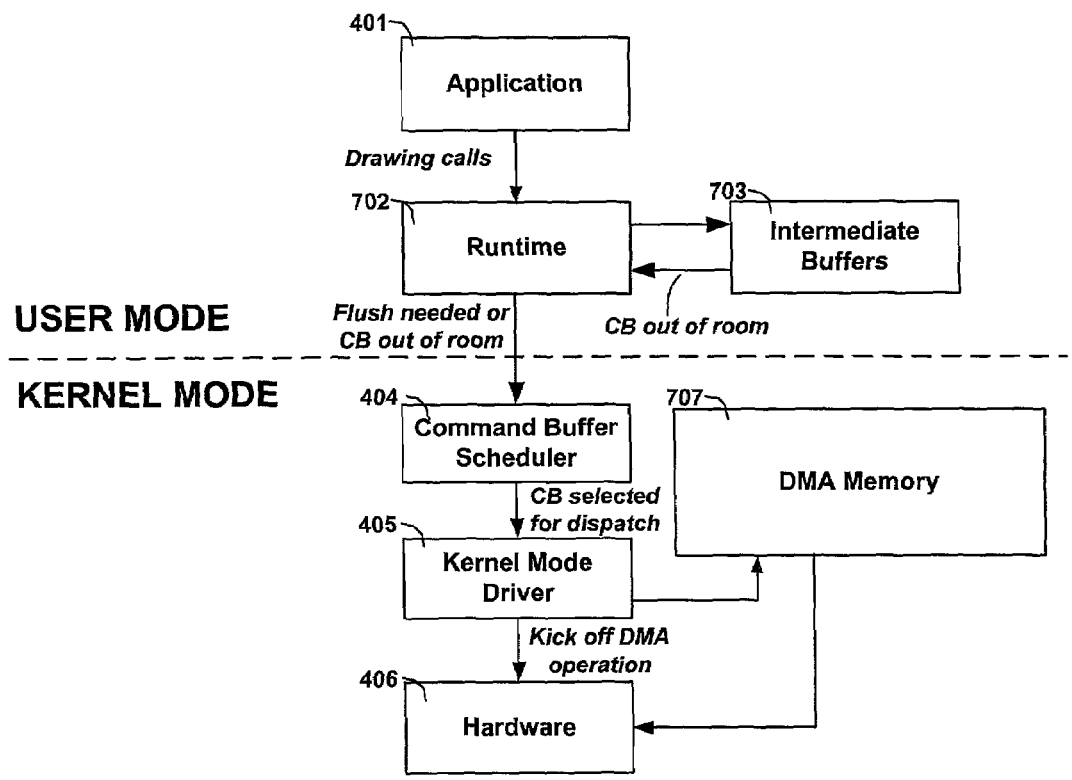
FIG. 7 illustrates an exemplary intermediate canonical command buffer format in accordance with an embodiment of the invention.

FIG. 7 illustrates an intermediate (non-hardware consumable) canonical command buffer FIG. 7 depicts another variation of the system in which the runtime 702 generates a buffer of commands 703 in a known format and that buffer is then scheduled. Once selected for dispatch, the kernel mode driver 405 must read through the buffer and translate it to hardware-specific commands. FIG. 7 shows those commands being written into DMA memory 707 by the kernel mode driver, though in such a system any mechanism for controlling the hardware could be used. The system of FIG. 7 closely resembles the state of the art in DIRECT3D® driver structure, in that a DrawPrimitives2 token stream is passed to the kernel mode driver 705. The main difference is that the system of FIG. 7 contemplates OS-arbitrated scheduling of the command buffers, while DIRECT3D® currently does not formally schedule the time of the GPU.

With respect to thread/GPU context affiliation, one skilled in the art can appreciate the definition of a thread of execution on the CPU: a thread encapsulates the volatile CPU registers and other CPU state that must be context switched by the operating system in order to enable multiple tasks to be worked on at the same time. By swapping thread contexts into and out of the CPU on a fine enough granularity, and allowing each to execute for some period of time (often known as the "thread quantum"), the operating system can provide the illusion of parallel execution by the threads.

The system(s) described in the foregoing make similar provision for the GPU analog of a CPU thread context. It is understood, however, that there are some benefits if the GPU context is affiliated with a CPU thread context, such that the GPU context can only be operated on by CPU code running in that thread. There is precedent in the industry for one-to-one correspondences between CPU and GPU contexts (cf. the OpenGL API), in which a CPU thread context can only have one GPU context (the "current context") associated with it. The management of the GPU contexts in such systems is coordinated by a monolithic driver provided by the vendor of the OpenGL accelerator in question, with little to no operating system involvement, so the benefits derived from a thread/GPU context affiliation in the context of OpenGL are significantly different than in the system described here.

From an efficiency standpoint, the obvious benefit that proceeds from affiliating a GPU context with a single CPU thread is that no thread synchronization (e.g., acquiring spinlocks, critical sections or mutexes) is needed to modify GPU state, since that thread is known to be the only one that can operate on that GPU context. Reducing the amount of thread synchronization confers a performance benefit. For example, no thread synchronization primitives would have to be acquired during the high frequency events depicted in FIG. 5 (drawing calls 502, validation 511, flush check 512, translate to DDI 513, translation from DDI to hardware commands 521, flush check 522, and command writes 523).

The following description illustrates the leveraging of existing thread synchronization primitives. One skilled in the art can appreciate that modern operating systems provide for numerous thread synchronization primitives such as spin locks, critical sections, mutexes, events, semaphores, resources (which can be acquired for shared access by multiple threads or exclusive access by a single thread), and so on. These thread synchronization primitives generally permit threads of execution to suspend execution until some event has occurred (such as an external event, a resource becoming available, and so on). If a thread is waiting on some such synchronization primitive(s), the operating system detects when the primitive(s) become 'signaled' such that the thread can continue execution. The semantics of the various synchronization primitives enumerated above are well documented. For illustrative purposes, we will describe the 'mutex' primitive, which is used to coordinate access to a shared resource. A 'mutex' can be acquired by only one thread at a time, and must be released before another thread can acquire it. When a mutex is released, more than one thread may be waiting on it, in which case the operating system must give the mutex to a single thread and unblock that thread until it releases the mutex in turn. The benefits of associating GPU contexts with CPU threads are independent of the details of the semantics and implementation of thread synchronization primitives (which are well understood by those skilled in the art), so we will not dwell on these details here.

The fundamental observation here is that if a GPU context is affiliated with one CPU thread in the system, suspending that thread using a thread synchronization primitive essentially makes that GPU context unavailable to the application until the CPU thread is unblocked. As long as the thread is suspended, that GPU context cannot be asked to perform drawing or other operations, since only the suspended thread could make such requests of the GPU context. If the underlying system provides the appropriate low level facilities (e.g., a flush of pending drawing commands to the corresponding GPU), applications could then use thread synchronization primitives to coordinate drawing with other threads' operations.

More importantly, there are numerous applications for the operating system to suspend threads that have GPU contexts selected into them, to prevent those GPUs from being operated on until the thread in question has been unblocked. For example, for purposes of resource management, it may be necessary to yield all of the GPU resources to a single application (e.g., in WINDOWS®, if a fullscreen exclusive DirectX games gets the application focus). The operating system could suspend other threads that wish to draw with the GPU, so they do not waste valuable time trying to draw while the resources needed to do so are unavailable to them.

With respect to integrating CPU and GPU context switching, if the GPU context/CPU context affiliation described above is strengthened such that a CPU context can only have one affiliated GPU context, another benefit potentially follows for certain hardware architectures in which there is a close association between the CPU and GPU (such as integrated and/or UMA graphics architectures). In this case, the operating system's thread context switching code could optionally load the affiliated GPU context at the same time the context of the CPU is loaded. This implementation strategy would be particularly advantageous on certain systems where it may not be necessary for CPU code to write GPU commands into command buffers that reside in external memory as depicted in FIG. 5. Since the thread's current GPU context is the only one that could possibly be operated on by code executing in the context of the thread whose context is in the CPU, making the hardware registers that correspond to the thread's GPU context available to that thread at the same time the CPU context is loaded would facilitate the immediate dispatch of drawing commands to the GPU, as opposed to writing those commands into a buffer for later consumption by the GPU. For example, on the x86 architecture, the hardware registers could be mapped into port I/O space so IN/OUT instructions could be used to communicate with the GPU; or alternatively, they could be exposed as memory mapped registers so reads and writes to particular memory locations would communicate with the GPU. Such facilities would have to be accompanied by rigorous validation of the commands submitted to the hardware, so spurious operations initiated by buggy or hostile code could not crash or corrupt the operating system. The user mode driver 520 in FIG. 5 would then simply perform operations on these hardware facilities as exposed to the current thread, rather than writing commands into a command buffer.

This scheme effectively merges most or all of the scheduling and waiting problems addressed in FIG. 5 into the operating system's thread scheduling mechanism. For example, the operating system includes facilities for suspension of threads that cannot execute until a given resource is available (e.g., a piece of memory to become available after being paged in); these facilities would have to be augmented such that threads with current GPU contexts would suspend until all the resources needed to continue execution became available, including the resources needed for the current GPU contexts of those threads. As with the virtual memory/paging function in the operating system, close collaboration between the operating system and the underlying hardware facilities would be required to implement such a system. Although a naïve implementation of such a system may result in more expensive thread context switching, it would be straightforward to implement optimizations such as not context switching the GPU if no GPU context is current to the CPU thread whose context is currently being loaded.

The systems described in connection with FIGS. 4 to 7 can leverage managed code. For example, as described in commonly assigned copending U.S. patent application Ser. No. 10/039,035, filed Jan. 4, 2002, and entitled "Systems and methods for managing drivers in a computing system", systems and methods are described for managing objects in intermediate language form in ways that are unique graphics processing and graphics systems. The system of FIG. 5, in particular, could leverage managed code, in which portions of the application 500, runtime 510, and/or user mode driver 520 are delivered in intermediate language form and JIT-compiled on the client. The three components would be delivered separately to the client in intermediate language form. The JIT compiler would then synthesize them into a unified piece of object code that included portions of all three components. The potential advantages of such an architecture are that more optimal object code would be executed; besides advantages such as optimizations specific to the microprocessor available on the client computer, for example, constants in the application 500's call to an entry point could be propagated into the runtime 510 and user mode driver 520, potentially resulting in object code that wrote a few constant words into the command buffer instead of crossing several function call boundaries in order to achieve the same result. The intermediate language form of the application 500 would still be hardware-independent, since the user mode driver 520 would be specific to the graphics hardware on the client.

While the largest hypothetical performance improvements would be achieved by generating managed code for all three components (the application 500, runtime 510, and user mode driver 520), a system could have the application 500 and runtime 510 be managed and interact with a separate user mode driver 520, or even just the application 500 be managed and interact with separate runtime 510 and user mode driver 520. In fact, such subsystems could be made to coexist peacefully, provided the intermediate language and user mode DLL forms of the runtime 510 and/or user mode driver 520 were both available.

The systems of FIGS. 6 and 7 could also benefit from late-bound managed code, much as has already been described. If the runtime 502 and 602 were managed, the JIT could perform optimizations such as parameter validation checks at runtime. In the system of FIG. 6, a unified piece of object code generated by the JIT would write canonical command buffer data into DMA-able memory for eventual submission to the hardware. In the system of FIG. 7, the object code generated by the JIT would emit data into an intermediate buffer for parsing and translation by the kernel mode driver.

For the most part, the systems described in this document presume that the hardware is DMA-capable, since multiple client applications may wish to send commands to the hardware and DMA is a straightforward way for those applications to operate in parallel with minimal interference or contention between each other. The invention can be reformulated to run on non-DMA hardware that is programmed using a different model, such as PIO or MMIO. To implement such a system, the user mode portion of the driver could write a set of hardware-independent tokens into the buffer rather than a hardware-specific token stream that could be consumed directly by the hardware. When the Scheduler submitted the command buffer to the kernel driver, the kernel driver would translate the hardware-independent tokens into hardware-specific commands and send them via the hardware's native control mechanism. To accommodate such an implementation, the system would have to make provision for allocation of non-DMA memory for the user mode driver to write into, and would have to implement a suitable mechanism for notification of command buffer completion. To address the issue of allocating non-DMA memory, the system could give the kernel driver the option of allocating command buffer memory for its user mode counterpart to write into. To address the issue of notification of command buffer completion, the interface to the kernel driver could give the driver the option of notifying the Scheduler via a return value that the command buffer had been executed by the hardware.

As mentioned above, while exemplary embodiments of the present invention have been described in connection with various computing devices and network architectures, the underlying concepts may be applied to any computing device or system in which it is desirable to manage coprocessing resources. Thus, the techniques for managing the computational resources of coprocessor(s) in accordance with the present invention may be applied to a variety of applications and devices. For instance, the managing techniques of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the managing techniques of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the resource management capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software. While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for controlling the computational resources of at least one coprocessor in a host computing system having a host processor, comprising:
   controlling the at least one coprocessor of the computing system with commands of command buffers submitted to the at least one coprocessor by a host processor of the host computing system;

transmitting, by the at least one coprocessor, data back to the host computing system in response to commands in at least one command buffer of the command buffers;

scheduling the transmission of the commands of the command buffers by a managing object included in the host computing system, wherein:
the computational resources of the at least one coprocessor are simultaneously available to a plurality of applications instantiated on the host computing system; and said managing object allows a plurality of types of coprocessor context; and affiliating coprocessor context with a host processor thread context.

2. A method according to claim 1, wherein said scheduling includes scheduling the transmission of the commands of the command buffers by an operating system included in the host computing system.

3. A method according to claim 1, wherein the managing object is notified by a coprocessor that commands of a command buffer has finished execution.

4. A method according to claim 1, further including queuing commands of a new command buffer for a coprocessor to begin executing when commands of a current command buffer are finished.

5. A method according to claim 1, further including specifying a coprocessor context switch when commands of a command buffer is submitted.

6. A method according to claim 1, further including integrating by the managing object the context switching code for the host processor and the coprocessor.

7. A method according to claim 1, further including notifying the managing object by a coprocessor that commands of a command buffer are invalid.

8. A method according to claim 1, further including resetting a coprocessor of the at least one coprocessor if the coprocessor is unresponsive for a predetermined period of time.

9. A method according to claim 1, further including translating by a hardware-specific driver object, via an application programming interface of the managing object, instructions of commands of a command buffer into hardware-specific instructions during composition of the commands of the command buffer.

10. A method according to claim 9, wherein said translating runs in user mode.

11. A method according to claim 10, further including allocating a guard page at the end of the commands of the command buffer to facilitate efficient detection of buffer overflow.

12. A method according to claim 10, wherein the user mode driver and corresponding runtime component are provided in intermediate language form and the method further includes just in time (JIT) compiling on a client device having the user mode driver and runtime component.

13. A method according to claim 12, wherein the application is also provided in intermediate language form and said JIT compiling includes JIT compiling the application on the client device with at least the user mode driver.

14. A method according to claim 11, wherein said driver object coordinates with a corresponding kernel mode driver object to edit the commands of the command buffer before submission to hardware.

15. A method according to claim 1, wherein the at least one coprocessor includes at least one graphics processing unit.

16. A method according to claim 1, further including preempting by the at least one coprocessor upon the occurrence of an external event.

17. A method according to claim 16, wherein the external event is the operating system making a call to a corresponding kernel mode driver object to preempt the at least one coprocessor.

18. A method according to claim 16, wherein the host processor is interrupted to coordinate scheduling of processing time.

19. A method according to claim 1, further including virtualizing by the managing object at least one resource of the at least one coprocessor during editing of control data streams of a command buffer before transmission to a coprocessor.

20. A method according to claim 19, wherein the at least one resource virtualized by the managing object of the at least one coprocessor is memory.

21. A method according to claim 1, wherein the managing object uses thread synchronization primitives to coordinate construction, scheduling and transmission of the commands of coprocessor command buffers.

22. At least one tangibly embodied computer readable medium having stored thereon a plurality of computer-executable modules for controlling the computational resources of at least one coprocessor in a host computing system having a host processor, the computer executable modules comprising:

a managing object for controlling the at least one coprocessor of the computing system with command data of command buffers submitted to the at least one coprocessor by a host processor of the host computing system and for scheduling the transmission of the command data; and means for transmitting, by the at least one coprocessor, data back to the host computing system in response to command data of at least one command buffer of the command buffers;

whereby the computational resources of the at least one coprocessor are simultaneously available to a plurality of applications instantiated on the host computing system; wherein:

said managing object allows a plurality of types of coprocessor context; and said managing object affiliates coprocessor context with a host processor thread context.

23. At least one computer readable medium according to claim 22, wherein said managing object is included in the operating system of the host computing system.

24. At least one computer readable medium according to claim 22, wherein the managing object is notified by a coprocessor that command data of a command buffer has finished execution.

25. At least one computer readable medium according to claim 22, wherein said managing object queues command data of a new command buffer for a coprocessor to begin executing when command data of a current command buffer is finished.

26. At least one computer readable medium according to claim 22, wherein said managing object specifies a coprocessor context switch when command data of a command buffer is submitted.

27. At least one computer readable medium according to claim 22, wherein said managing object integrates the context switching code for the host processor and the coprocessor.

28. At least one computer readable medium according to claim 22, wherein a coprocessor comprises means for notifying the managing object that command data of a command buffer is invalid.

29. At least one computer readable medium according to claim 22, wherein said managing object resets a coprocessor of the at least one coprocessor if the coprocessor is unresponsive for a predetermined period of time.

30. At least one computer readable medium according to claim 22, wherein said managing object enables translating by a hardware-specific driver object instructions of command data of a command buffer into hardware-specific instructions during composition of command data of the command buffer.

31. At least one computer readable medium according to claim 30, wherein said translating by the driver object runs in user mode.

32. At least one computer readable medium according to claim 31, wherein said managing object allocates a guard page at the end of the command data of the command buffer to facilitate efficient detection of buffer overflow.

33. At least one computer readable medium according to claim 31, wherein the user mode driver and corresponding runtime component are provided in intermediate language form and the user mode driver and runtime component are just in time (JIT) compiled.

34. At least one computer readable medium according to claim 33, wherein the application is also provided in intermediate language form and at least the application and the user mode driver are JIT compiled.

35. At least one computer readable medium according to claim 31, wherein said driver object coordinates with a corresponding kernel mode driver object to edit the command data of the command buffer before submission to hardware.

36. At least one computer readable medium according to claim 22, wherein the at least one coprocessor includes at least one graphics processing unit.

37. At least one computer readable medium according to claim 22, wherein the managing object is preempted by the at least one coprocessor upon the occurrence of an external event.

38. At least one computer readable medium according to claim 37, wherein the external event is the operating system making a call to a corresponding kernel mode driver object to preempt the at least one coprocessor.

39. At least one computer readable medium according to claim 22, wherein the host processor is interrupted to coordinate scheduling of processing time by the managing object.

40. At least one computer readable medium according to claim 22, wherein the managing object virtualizes at least one resource of the at least one coprocessor during editing of control data streams of a command buffer before transmission to a coprocessor.

41. At least one computer readable medium according to claim 40, wherein the at least one resource virtualized by the managing object of the at least one coprocessor is memory.

42. At least one computer readable medium according to claim 22, wherein the managing object uses thread synchronization primitives to coordinate construction, scheduling and transmission of command data of coprocessor command buffers.

43. A computing device having a host processor for controlling the computational resources of at least one coprocessor in a host computing system, comprising:

a managing object for controlling the at least one coprocessor of the host computing system with command data of command buffers submitted to the at least one coprocessor by the host processor of the host computing system and for scheduling the transmission of the command data of the command buffers; and means for transmitting, by the at least one coprocessor, data back to the host computing system in response to command data in at least one command buffer of the command buffers;

whereby the computational resources of the at least one coprocessor are simultaneously available to a plurality of applications instantiated on the host computing system; wherein:

said managing object allows a plurality of types of coprocessor context; and said managing object affiliates coprocessor context with a host processor thread context.

44. A computing device according to claim 43, wherein said managing object is included in the operating system of the host computing system.

45. A computing device according to claim 43, wherein the managing object is notified by a coprocessor that command data of a command buffer has finished execution.

46. A computing device according to claim 43, wherein said managing object queues command data of a new command buffer for a coprocessor to begin executing when command data of a current command buffer is finished.

47. A computing device according to claim 43, wherein said managing object specifies a coprocessor context switch when command data of a command buffer is submitted.

48. A computing device according to claim 43, wherein said managing object integrates the context switching code for the host processor and the coprocessor.

49. A computing device according to claim 43, wherein a coprocessor comprises means for notifying the managing object that command data of a command buffer is invalid.

50. A computing device according to claim 43, wherein said managing object resets a coprocessor of the at least one coprocessor if the coprocessor is unresponsive for a predetermined period of time.

51. A computing device according to claim 43, wherein said managing object enables translating by a hardware-specific driver object instructions of command data of a command buffer into hardware-specific instructions during composition of the command data of the command buffer.

52. A computing device according to claim 51, wherein said translating by the driver object runs in user mode.

53. A computing device according to claim 52, wherein said managing object allocates a guard page at the end of the command data of the command buffer to facilitate efficient detection of buffer overflow.

54. A computing device according to claim 52, wherein the user mode driver and corresponding runtime component are provided in intermediate language form and the user mode driver and runtime component are just in time (JIT) compiled.

55. A computing device according to claim 54, wherein the application is also provided in intermediate language form and at least the application and the user mode driver are JIT compiled.

56. A computing device according to claim 54, wherein said driver object coordinates with a corresponding kernel mode driver object to edit the command data of the command buffer before submission to hardware.

57. A computing device according to claim 43, wherein the at least one coprocessor includes at least one graphics processing unit.

58. A computing device according to claim 43, wherein the managing object is preempted by the at least one coprocessor upon the occurrence of an external event.

59. A computing device according to claim 58, wherein the external event is the operating system making a call to a corresponding kernel mode driver object to preempt the at least one coprocessor.

60. A computing device according to claim 43, wherein the host processor is interrupted to coordinate scheduling of processing time by the managing object.

61. A computing device according to claim 43, wherein the managing object virtualizes at least one resource of the at least one coprocessor during editing of control data streams of a command buffer before transmission to a coprocessor.

62. A computing device according to claim 61, wherein the at least one resource virtualized by the managing object of the at least one coprocessor is memory.

63. A computing device according to claim 43, wherein the managing object uses thread synchronization primitives to coordinate construction, scheduling and transmission of command data of coprocessor command buffers.

* * * * *